United States Patent
Dong et al.

(10) Patent No.: US 7,631,496 B2
(45) Date of Patent: Dec. 15, 2009

(54) HYDRAULIC UNIT WITH INTEGRAL OIL COOLER

(75) Inventors: Xingen Dong, Greenville, TN (US); Barun Acharya, Johnson City, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 270 days.

(21) Appl. No.: 11/536,358

(22) Filed: Sep. 28, 2006

(65) Prior Publication Data

US 2007/0068151 A1   Mar. 29, 2007

Related U.S. Application Data

(60) Provisional application No. 60/721,259, filed on Sep. 28, 2005.

(51) Int. Cl.
*E02F 9/00* (2006.01)
*F16H 39/02* (2006.01)

(52) U.S. Cl. .............. 60/456; 60/329; 60/912

(58) Field of Classification Search .......... 60/456, 60/487, 912, 329
See application file for complete search history.

(56) References Cited

U.S. PATENT DOCUMENTS

| | | | |
|---|---|---|---|
| 5,394,699 A | | 3/1995 | Matsufuji |
| 5,622,051 A | * | 4/1997 | Iida et al. .............. 60/456 |
| 6,073,443 A | * | 6/2000 | Okada et al. ............ 60/456 |
| 6,167,619 B1 | * | 1/2001 | Beagle ............... 29/890.043 |
| 6,233,929 B1 | | 5/2001 | Okada et al. |
| 6,592,336 B1 | * | 7/2003 | Hirano et al. ............ 417/201 |
| 6,736,605 B2 | | 5/2004 | Ohashi et al. |

FOREIGN PATENT DOCUMENTS

| | | |
|---|---|---|
| GB | 2062187 | 12/1989 |
| JP | 01300073 | 5/1981 |
| JP | 2001220770 A * | 8/2001 |

* cited by examiner

*Primary Examiner*—Thomas E Lazo
(74) *Attorney, Agent, or Firm*—Renner, Otto, Boisselle & Sklar, LLP

(57) ABSTRACT

A hydraulic unit including an integrated fluid cooler. The fluid cooler includes a flow-through type heat exchanger. The hydraulic unit can include a pump, a motor, or both a pump and a motor. The fluid cooler can be carried by a housing of the hydraulic unit and a fan for moving air through the fluid cooler and circulating air over at least a portion of the housing of the hydraulic unit can be interposed between the fluid cooler and the housing. The fluid cooler can also be configured to function as a fan shroud. Fluid from the hydraulic unit as well as fluid from other sources can be circulated through the fluid cooler.

12 Claims, 5 Drawing Sheets

HYDRAULIC UNIT WITH INTEGRAL OIL COOLER

RELATED APPLICATIONS

This application claims the benefit of U.S. Provisional Application No. 60/721,259 filed Sep. 28, 2005, which is hereby incorporated herein by reference.

FIELD OF THE INVENTION

The present invention generally relates to hydraulic units and particularly to hydraulic pumps and motors for use in vehicles, such as mowing machines.

BACKGROUND

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is typically connected through suitable gearing to the vehicle's wheels or tracks.

Hydrostatic transmissions generate heat as the hydraulic fluid is circulated between the pump and the motor. Friction between moving parts of the pump and/or motor also generates heat. Hydrostatic transmissions commonly operate at temperatures in excess of 275 degrees Fahrenheit. In order to operate at such high temperatures, an expensive synthetic oil, such as MOBILE 1, is often used. Operating at such high temperatures raises various concerns such as durability.

External oil coolers have been used to dissipate heat from hydrostatic transmission. Such external oil coolers are typically connected to the closed loop hydraulic circuit and circulate hot oil from the closed loop through a heat exchanger located remotely from the transmission. Cooled fluid from the exchanger is then returned to the closed loop. Prior art external oil coolers mounted to a vehicle separate from the hydrostatic transmission are connected to the hydraulic transmission via supply and return lines. Such external coolers can be expensive and require additional space onboard a vehicle for mounting, thereby increasing the overall size of the hydrostatic transmission.

Another approach to cooling hydrostatic transmissions involves mounting a fan to a rotatably driven shaft of the hydrostatic transmission. The fan is configured to circulate air around the external surfaces of the hydrostatic transmission to dissipate heat. This approach, though relatively inexpensive, is limited to heat transfer through the external surface of the hydrostatic transmission which can be inadequate, particularly as hydrostatic transmissions continue to become more compact and powerful.

Still another approach is described in U.S. Pat. No. 5,622, 051. According to this approach, the hot oil is passed through a cooling tube equipped with cooling fins for dissipation of heat. The cooling tube passes around an output shaft to which a fan is connected, and thus some of the cooling tube is located in the path of the forced air flow. In another embodiment, a transmission housing has formed therein an oil flow passage adjacent an outer wall equipped with cooling fins to dissipate heat from the oil. While affording some cooling, these arrangements are considerably less efficient and effective than the above-noted external coolers.

SUMMARY OF THE INVENTION

The present invention provides a hydraulic unit including a hydraulic drive component such as hydraulic pump, motor, or hydrostatic transmission including a pump and motor, and an integrated fluid cooler. The hydraulic drive component has housing and a drive shaft exiting from a side of the housing. A cooling fan is mounted to the drive shaft whereby the fan will be rotated to generate air flow directed at the housing for flow around the housing. The fluid cooler preferably includes a flow-through type heat exchanger mounted to and carried by the housing closely adjacent the fan such that the fan will cause air to flow through the heat exchanger for cooling of fluid passed through the heat exchanger before passage of the air to and around the housing. The fluid cooler may be configured to function as a fan shroud, and fluid from the hydraulic unit and/or fluid from other sources can be circulated through the fluid cooler.

Accordingly, the invention provides a hydraulic pump and/or motor having a housing, a fluid cooler including a flow-through heat exchanger spaced apart from the housing for cooling fluid associated with the hydraulic pump and/or motor, and a fan positioned to cause air to flow through the fluid cooler and pass over at least a portion of the housing.

In an exemplary embodiment, the fluid cooler is carried by the housing of the hydraulic pump or motor, and the fluid cooler and housing together form a fan shroud at least partially enshrouding the fan. The pump or motor has a rotatably driven shaft to which the fan is mounted for rotation therewith. The flow-through heat exchanger has opposite sides and a plurality of through apertures through which air can flow from one side to the other. The fan can be configured to draw air through the heat exchanger or to push air through the heat exchanger. The heat exchanger can be a manifold-type heat exchanger having an inlet manifold, an outlet manifold, and a plurality of flow passages through which fluid can flow from the inlet manifold to the outlet manifold. The hydraulic unit can be a hydrostatic transmission system, for example an integrated hydrostatic transition having a hydraulic pump and a hydraulic motor disposed within the housing. The fan is can be interposed between the fluid cooler and the housing. Alternatively, the fluid cooler can be interposed between the fan and the housing. A fan shroud for at least partially enshrouding the fan can include the fluid cooler.

Further features of the invention will become apparent from the following detailed description when considered in conjunction with the drawings.

DETAILED DESCRIPTION

Figure 1:
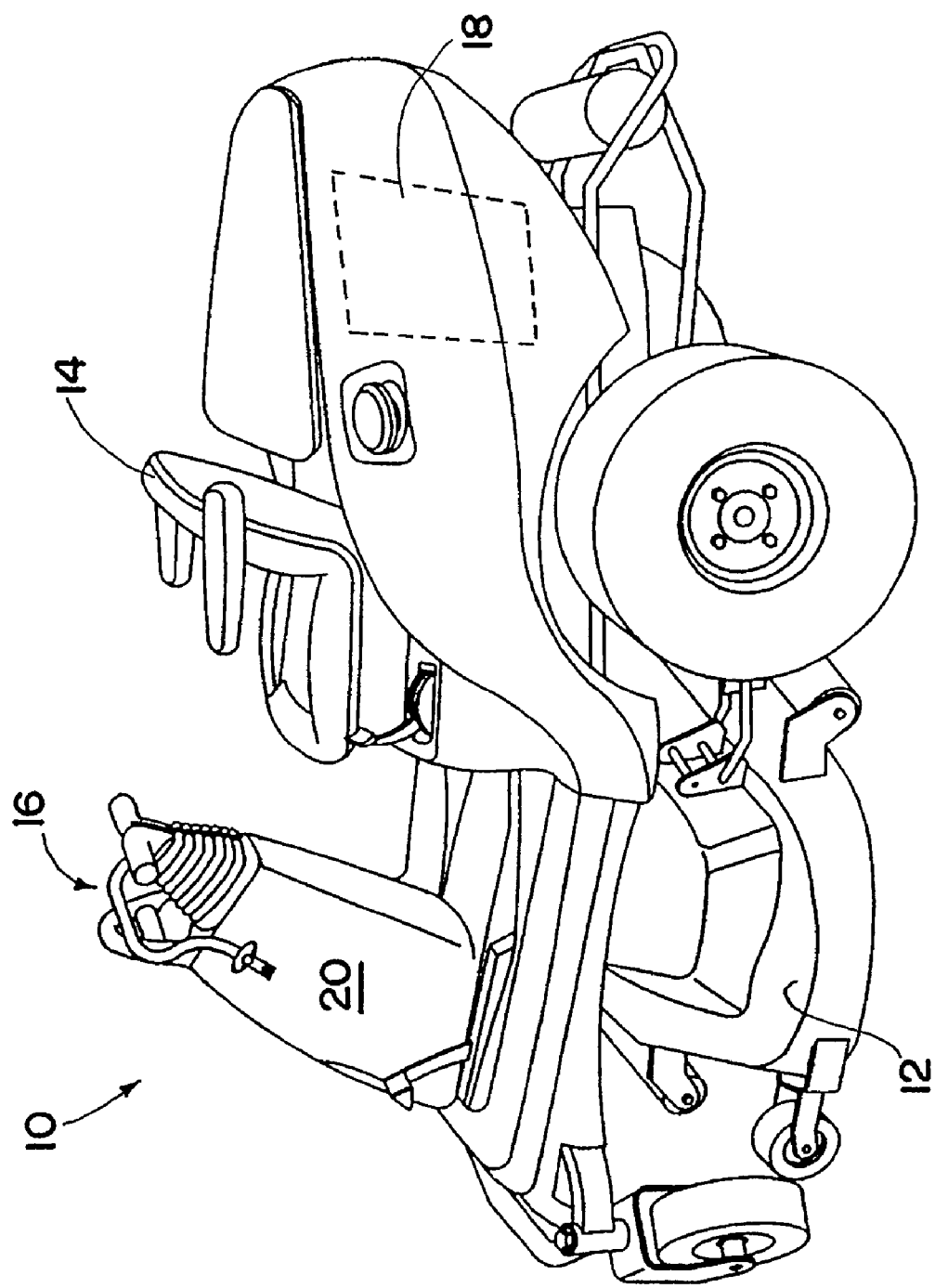
FIG. 1 is a zero-turn-radius mower in accordance with the invention.

Referring now to the drawings in detail, and initially to FIG. 1, an exemplary zero-turn-radius mower 10 is illustrated. The mower 10 includes a mower deck 12 for mowing grass, an operator seat 14, and a plurality of controls 16 for operating the mower 10. A rear-mounted engine 18, which can be an internal combustion engine, provides power to the one or more hydraulic units (not shown) that are typically mounted to a frame of the mower 10 under the seat 14. The hydraulic units function to propel the mower and provide zero-turn-radius functionality. The zero-turn-radius mower 10 can include one or more hydraulic units (not shown in FIG. 1) in accordance with the invention.

Figure 2:
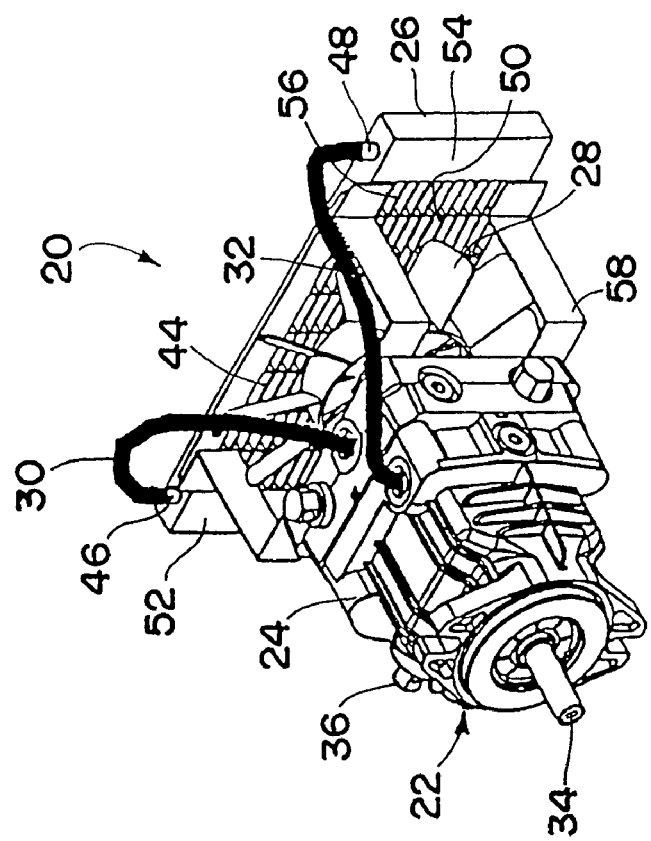
FIG. 2 is a perspective view of an exemplary hydraulic unit including a pump and fluid cooler in accordance with the invention.
Figure 3:
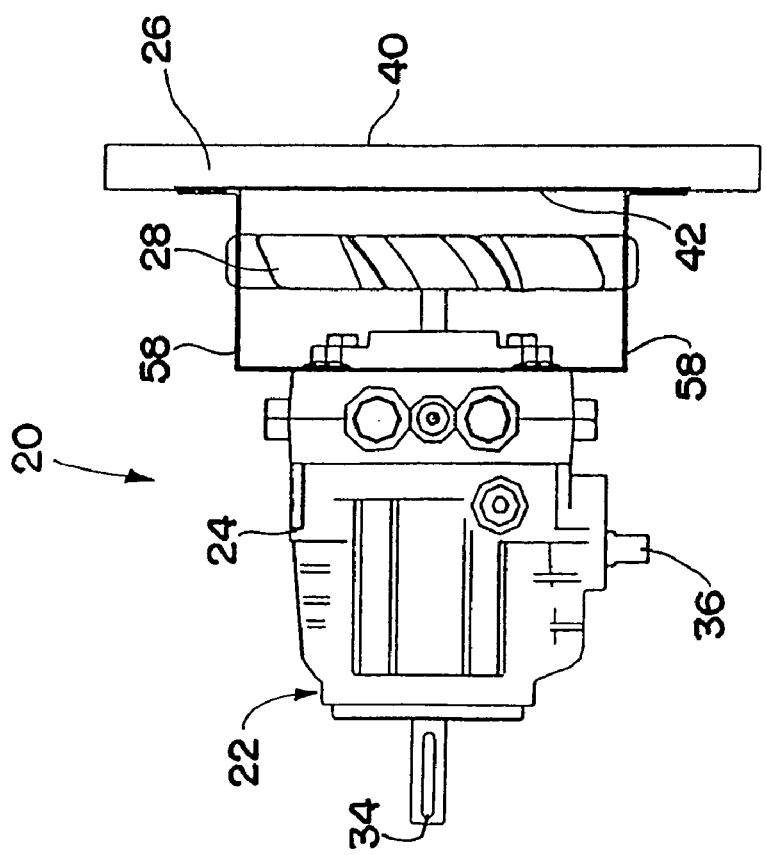
FIG. 3 is a side view of the hydraulic unit of FIG. 2.

Turning to FIGS. 2 and 3, an exemplary hydraulic unit 20 in accordance with the invention is illustrated. The illustrated hydraulic unit 20 includes a pump 22 having a pump housing 24, a fluid cooler 26, and a fan 28 interposed between the fluid cooler 26 and the pump housing 24 for causing air to flow through the fluid cooler 26 and pass over at least a portion of the pump housing 24. The fluid cooler 26 is connected to the hydraulic pump 22 via supply and return lines 30 and 32.

In the illustrated embodiment, the pump 22 is a variable flow reversible piston pump, although it will be appreciated that the hydraulic pump 22 could be of any suitable type. More generally, the invention may be practiced with a hydraulic drive component other than a pump, such as a hydraulic motor or hydrostatic transmission including both a motor and pump, which drive component is equipped with a cooling fan mounted to a drive shaft extending from the component's housing that contains the internal drive elements of the hydraulic drive component. Accordingly, the hereinafter description of various embodiments of the invention including a hydraulic pump is not intended to be limiting to hydraulic pumps but rather to be illustrative of the principles of the invention which may be applied to other hydraulic drive components as above noted.

As shown in FIGS. 2 and 3, the hydraulic pump 22 has a rotatably driven shaft 34 for connection to a prime mover (not shown in FIGS. 2 and 3), such as the internal combustion engine 18 of mower 10 in FIG. 1. For example, the rotatable shaft 34 may have connected thereto a pulley that can be driven by a belt connected to the engine 18. A cylinder barrel (not shown) having a plurality of pistons mounted for reciprocal movement therein is coupled to the shaft 34. In a conventional manner, a swash block (not shown) is provided for controlling pump flow output. The swash block is controlled by a trunnion shaft 36. By controlling the swash-block, the flow rate and the flow direction of the pump flow output can be controlled.

The shaft 34 may extend though and from the backside of the housing 24, or a separate drive shaft may be provided for the fan 28 that is mounted to the shaft for rotation therewith. The fan 28 can be configured to draw air through the fluid cooler 26 and then direct the air toward and around the housing 24. Alternatively, the fan 28 can be configured to draw air from around the housing 24 and then push the air through the fluid cooler 26.

The fluid cooler 26 preferably includes a flow-through heat exchanger 38 having opposites sides 40 and 42 and a plurality of through-apertures 44 through which air can flow from one side to the other. The heat exchanger 38 includes an inlet 46, an outlet 48, and a plurality of flow passages 50 through which fluid flows from the inlet 46 to the outlet 48. The heat exchanger 38 can include an inlet manifold 52 and an outlet manifold 54 connecting the plurality of flow passages 50. A plurality of fins 56, which can be thin metal plates, are arranged about the flow passages 50 to facilitate heat transfer as air passes through the heat exchanger 38.

The fluid cooler 26 preferably is mounted to and carried by the housing 24 and is spaced from the housing 24 to provide a space for the fan 28 to be interposed therebetween. In this regard, Z-shape brackets 58 (or other suitable means) are used to secure the fluid cooler 26 to the pump housing 24 in such spaced-apart arrangement. The brackets 58 (or other mounting components) and fluid cooler 26 together form a fan shroud covering at least part of the fan 28 to prevent foreign objects from inadvertently contacting the fan 28. The fan shroud also can assist in directing air flow around the housing 24 and/or through the fluid cooler 26 thereby increasing the efficiency of the fan 28. More particularly, the brackets or other mounting structure extending between the heat exchanger and the housing can more completely surround and enclose the fan than as presently shown, if desired.

In operation, fluid associated with the pump 22 is circulated through the fluid cooler 26 via supply and return lines 30 and 32. Fluid enters the fluid cooler via inlet 46 and passes to the outlet 48 via passageways 50. As the fluid travels through the passageways 50, heat is extracted from the fluid as air flows through the fluid cooler 26.

It will be appreciated that a thermostat can be provided so that fluid only flows to the fluid cooler 26 when the fluid temperature exceeds a prescribed temperature. Further, the fluid cooler 26 can be used to cool fluid from a wide variety of sources such as, for example, an auxiliary hydraulic circuit. Oil from the internal combustion engine could also be adapted to flow through the fluid cooler 26. Accordingly, it will be appreciated that the integrated fluid cooler 26 can be used to cool fluid from not only the hydraulic unit, but units as well.

Figure 4:
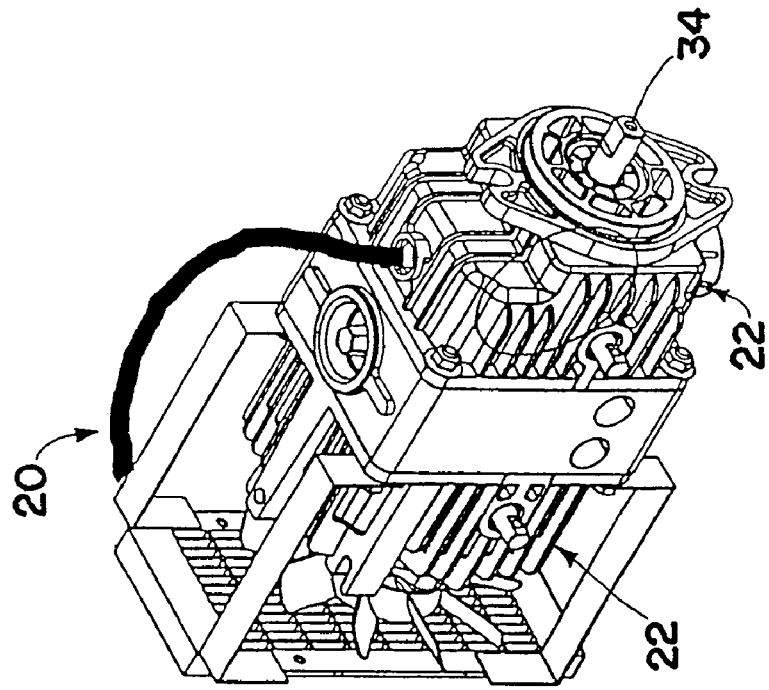
FIG. 4 is a perspective view of an exemplary hydraulic unit including dual hydraulic pumps and a fluid cooler in accordance with the invention.
Figure 5:
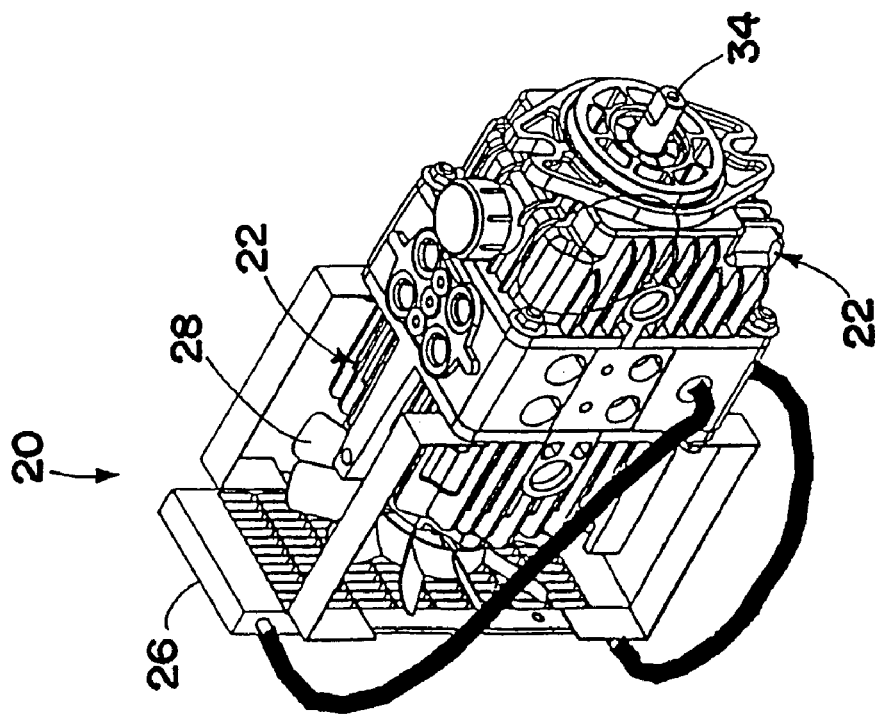
FIG. 5 is another perspective view of the hydraulic unit of FIG. 5.

Turning to FIGS. 4 and 5 another hydraulic unit in accordance with the invention is illustrated. The hydraulic unit includes two hydraulic pumps 22 mounted in-line and driven by a common rotatably driven shaft 34. The hydraulic pumps 22 can be variable rate reversible flow piston pumps as previously described. Each pump 22 can be connected via suitable hoses to separate hydraulic motors (not shown), for example, for driving respective rear wheels of a zero-turn radius mower.

Similar to the embodiment of FIGS. 2 and 3, the hydraulic pumps 22 include a pump housing 24, a fluid cooler 26 carried by the pump housing 24, and a fan 28 interposed between the fluid cooler 26 and the pump housing 24 for moving air through the fluid cooler 26 and circulating air over at least a portion of the housing 24. Supply and return lines 30 and 32 connect the fluid cooler 26 to the hydraulic pumps 22 and supply heated fluid to the fluid cooler 26 and return cooled fluid to the hydraulic pumps 22.

Figure 6:
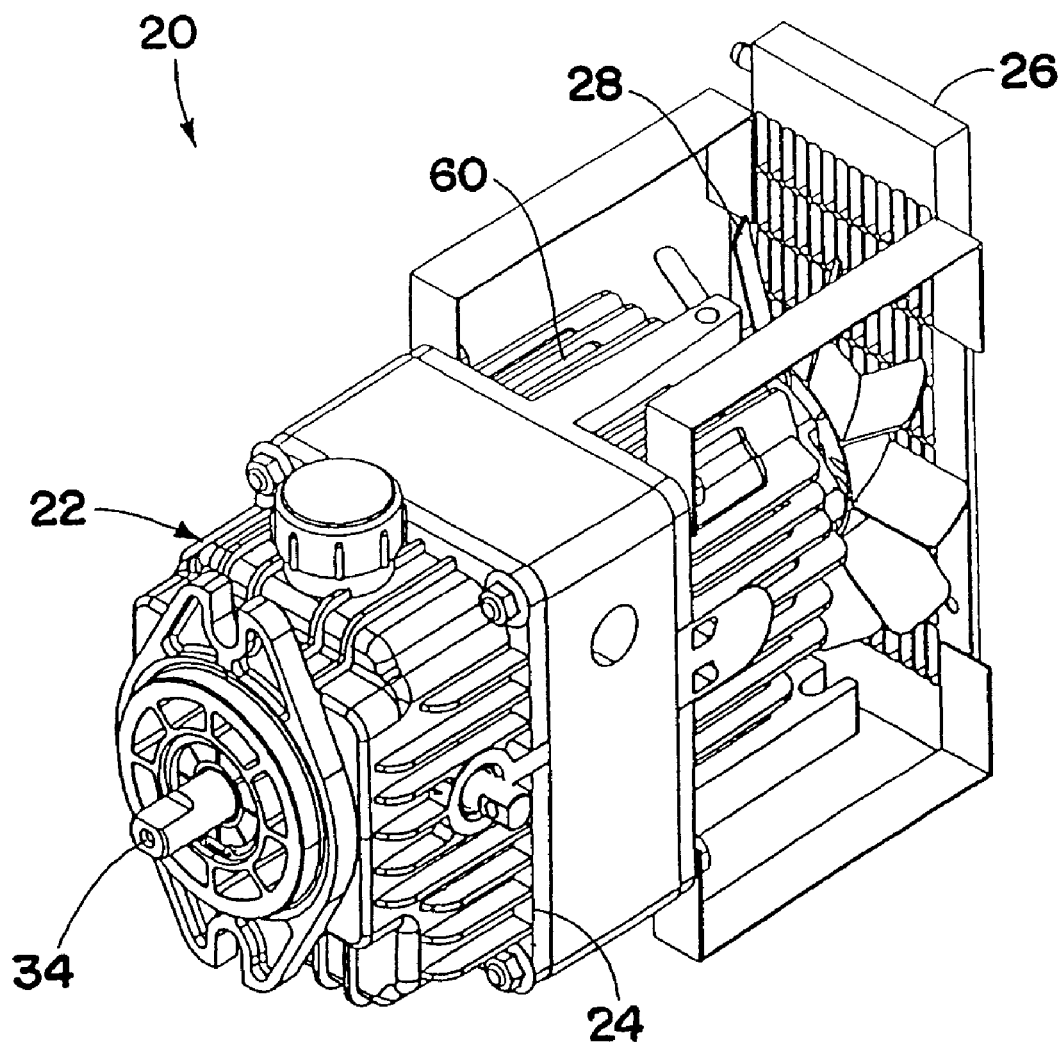
FIG. 6 is a perspective view of an exemplary hydraulic unit including a pump, a motor and a fluid cooler in accordance with the invention.

Turning now to FIG. 6, yet another hydraulic unit 20 in accordance with the invention as illustrated. In this embodiment, the hydraulic unit includes a hydraulic pump 22 and a hydraulic motor 60 connected together in a closed hydraulic loop thereby forming a hydrostatic transmission. The hydraulic pump 22 and motor 60 of the hydrostatic transmission are contained within a pump/motor housing 24, and a fluid cooler 26 is carried by the pump/motor housing 26. The hydraulic pump 22 can be a variable rate reversible flow piston pump, as previously described. The hydraulic pump 22 supplies fluid in a conventional manner to the hydraulic motor 60 to produce rotation of an output shaft (not visible in FIG. 6) of the hydraulic motor 60. A fan 28 is mounted to the output shaft and interposed between the fluid cooler 26 and the housing 24 in a manner similar to the previous embodiments. Supply and return lines (not shown) connect the closed circuit of the hydrostatic transmission to the fluid cooler 26 for supplying heated fluid thereto and returning cooled fluid therefrom.

Figure 7:
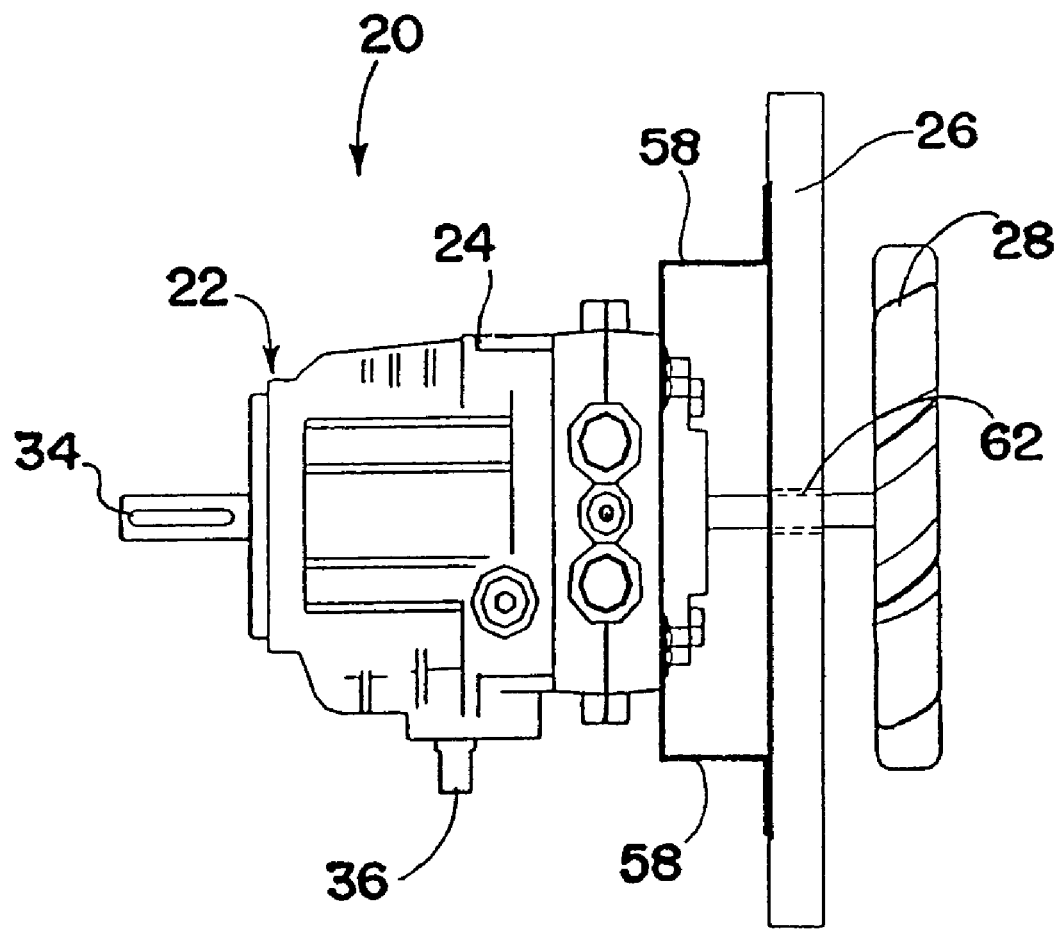
FIG. 7 is a side view of another exemplary hydraulic unit in accordance with the invention.

Turning to FIG. 7, another hydraulic unit 20 in accordance with the invention is illustrated. In this embodiment, the fluid cooler 26 is interposed between the housing 24 and the fan 28. The fan 28 is mounted to the shaft 34 which extends through the fluid cooler 26. The shaft 34 passes through the fluid cooler 26 via a suitable shaft opening 62. The fan 28 can be configured to push air through the fluid cooler 26 or draw air through the fluid cooler 26, as desired.

It will now be appreciated that the invention provides a hydraulic unit including an integrated fluid cooler. The fluid cooler can be carried by a housing of the hydraulic unit and a fan for moving air through the fluid cooler and circulating air over at least a portion of the housing of the hydraulic unit can be interposed between the fluid cooler and the housing. The fluid cooler can be configured to function as a fan shroud.

The heat exchanger can be any suitable type. For example, the flow passages of the heat exchanger can be connected serially, essentially forming one flow passage, or in parallel (as in a manifold-type fluid cooler).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic unit comprising:
a hydraulic pump and/or motor having a housing;
a fluid cooler including a flow-through heat exchanger spaced apart from the housing for cooling fluid associated with the hydraulic pump and/or motor; and
a fan positioned to cause air to flow through the fluid cooler and pass over at least a portion of the housing;
wherein the fluid cooler is carried by the housing;
wherein the hydraulic unit is a hydrostatic transmission including both a hydraulic pump and a hydraulic motor.

2. A hydraulic unit as set forth in claim 1, wherein the pump or motor has a rotatably driven shaft to which the fan is mounted for rotation therewith.

3. A hydraulic unit as set forth in claim 1, wherein the hydrostatic transmission is an integrated hydrostatic transmission having the hydraulic pump and hydraulic motor disposed within the housing.

4. A hydraulic unit as set forth in claim, 1, wherein the flow-through heat exchanger has opposite sides and a plurality of through apertures through which air can flow from one side to the other.

5. A hydraulic unit as set forth in claim 1, wherein the fan is configured to draw air through the fluid cooler.

6. A hydraulic unit as set forth in claim 1, wherein the fan is configured to push air through the fluid cooler.

7. A hydraulic unit as set forth in claim 1, wherein the flow-through heat exchanger is a manifold-type heat exchanger having an inlet manifold, an outlet manifold, and a plurality of flow passages through which fluid can flow from the inlet manifold to the outlet manifold.

8. A hydraulic unit as set forth in claim 7, further comprising a plurality of fins radiating from an external surface of the plurality of flow passages.

9. A hydraulic unit comprising:
a hydraulic pump and/or motor having a housing;
a fluid cooler including a flow-through heat exchanger spaced apart from the housing for cooling fluid associated with the hydraulic pump and/or motor; and
a fan positioned to cause air to flow through the fluid cooler and pass over at least a portion of the housing; and
a fan shroud including the fluid cooler;
wherein the fluid cooler is interposed between the fan and the housing.

10. A lawn mower including a frame to which at least one drive wheel is mounted, and a hydraulic unit mounted to the frame and operatively drivingly coupled to the drive wheel, wherein the hydraulic unit includes
a hydraulic pump and/or motor having a housing;
a fluid cooler including a flow-through heat exchanger spaced apart from the housing for cooling fluid associated with the hydraulic pump and/or motor; and
a fan positioned to cause air to flow through the fluid cooler and pass over at least a portion of the housing; and
a fan shroud including the fluid cooler.

11. A hydraulic unit comprising:
a hydraulic pump and/or motor having a housing;
a fluid cooler including a flow-through heat exchanger spaced apart from the housing for cooling fluid associated with the hydraulic pump and/or motor; and
a fan positioned to cause air to flow through the fluid cooler and pass over at least a portion of the housing; and
a fan shroud including the fluid cooler, and further comprising at least one bracket for supporting the fluid cooler, the bracket extending between the housing and the fluid cooler.

12. A hydraulic unit as set forth in claim 11, wherein the fluid cooler and at least one bracket together form a fan shroud covering at least part of the fan.

* * * * *